United States Patent [19]
Amagami et al.

[11] 4,016,390
[45] Apr. 5, 1977

[54] INDUCTION HEATING APPARATUS WITH PROTECTIVE CIRCUIT ARRANGEMENT

[75] Inventors: Keizo Amagami; Takao Kobayashi; Yoshio Ogino; Mitsuyuki Kiuchi, all of Kadoma, Japan

[73] Assignee: Matsushita Electric Industrial Co., Ltd., Kadoma, Japan

[22] Filed: May 22, 1975

[21] Appl. No.: 579,897

Related U.S. Application Data

[62] Division of Ser. No. 415,542, Nov. 14, 1973, abandoned.

[30] Foreign Application Priority Data

| Nov. 15, 1972 | Japan | 47-114990 |
| Nov. 16, 1972 | Japan | 47-115378 |
| Nov. 17, 1972 | Japan | 47-115809 |
| Nov. 20, 1972 | Japan | 47-116923 |
| Aug. 10, 1973 | Japan | 47-90404 |

[52] U.S. Cl. .......................... 219/10.49; 219/10.77; 321/14
[51] Int. Cl.² .............................................. H05B 5/04
[58] Field of Search ......... 219/10.49, 10.77, 10.75, 219/10.79; 321/18, 45, 43, 44, 14, 16; 307/240

[56] References Cited
UNITED STATES PATENTS

| 3,775,577 | 11/1973 | Peters | 219/10.49 |
| 3,821,509 | 6/1974 | Amagami et al. | 219/10.77 |

*Primary Examiner*—Bruce A. Reynolds

[57] ABSTRACT

An induction heating apparatus is provided with protective circuit arrangements which ensure against surge currents caused by inappropriately timed gating-on of a gate controlled rectifier or by erroneous use of a load material such as non-magnetic or ferromagnetic material. The timed gating of the gate-controlled rectifier is accomplished by means of a delay circuit which serves to count timing after a rectified excitation potential drops to the zero voltage point. A coincidence circuit is provided to detect coincidence of two signals, one is a pulse having a predetermined width and the other is a signal derived when the periodic cycle of the energization currents departs from the predetermined cycle period.

2 Claims, 10 Drawing Figures

INDUCTION HEATING APPARATUS WITH PROTECTIVE CIRCUIT ARRANGEMENT

This is a division of Ser. No. 415,542, filed Nov. 14, 1973, now abandoned, in favor of copending continuation application Ser. No 596,203 filed July 7, 1975.

The present invention relates generally to induction heating apparatus, and in particular to an induction heating apparatus wherein protective circuit arrangement are provided to assure safety operation of the apparatus.

In a prior art induction heating apparatus, an inverter circuit comprising an induction heating coil and a capacitor is supplied with a full-wave rectified unidirectional excitation potential which is switched on and off by means of a gate-controlled rectifier at the beginning of each half cycle of the potential. However, inappropriately timed gating of the gate-controlled rectifier would result in the generation of a surge current which could destroy the apparatus. Another disadvantage is that erroneous use of a non-magnetic or ferromagnetic material as a load to be heated would cause a shift in the oscillation frequency of the energization currents due to the departure of the load inductance value from the predetermined load inductance.

It is therefore an object of the present invention to provide an improved induction heating apparatus which is provided with a protective circuit to ensure against surge currents which might occur due to inappropriately timed gating of the gate-controlled rectifier and the erroneous use of a material to be heated.

Another object of the present invention is the provision of an improved gate control circuit for induction heating apparatus which is capable of providing reliable gating-on pulses at a predetermined timed interval.

A further object of the present invention is the provision of an improved start-up circuit which is capable of energizing the gate controlled circuit at a proper timing to initiate oscillatory energization currents.

A still further object of the present invention is the provision of an improved abnormal load condition detector which detects the variation of oscillatory energization frequency in a simplified circuit arrangement.

In accordance with the present invention, there is provided an improved induction heating apparatus which is provided with a protective circuit arrangement. The induction heating apparatus comprises generally an inverter circuit, a full-wave rectifier for supplying the inverter circuit with a full-wave rectified, unfiltered unidirectional excitation potential, a gate control circuit for providing gate-on pulses to the inverter circuit, a start-up circuit for enabling the gate control circuit and an abnormal load condition detector. The inverter circuit includes an induction heating coil and a gate-controlled rectifier that is coupled to and supplies the induction heating coil with periodic energization currents. The present invention is characterized in that the gate-controlled rectifier is gated on at a predetermined time after the full-wave rectified excitation potential drops to zero voltage level and reapplied excitation potential rises to voltage level suitable for firing. The present invention is further characterized by an abnormal load condition detector which detects frequency variation of the periodic energization currents. The detector includes a coincidence circuit to provide an output only when one complete cycle of the energization currents lies outside of the predetermined time period and continuously energize the gate-controlled rectifier. Upon continuous energization of the gate-controlled rectifier, a circuit breaker provided in the power supply circuit will be actuated to disconnect the apparatus from the power source.

These and other objects and features of the present invention will be better understood from the following description taken in conjunction with the accompanying drawings, in which.

Figure 1:
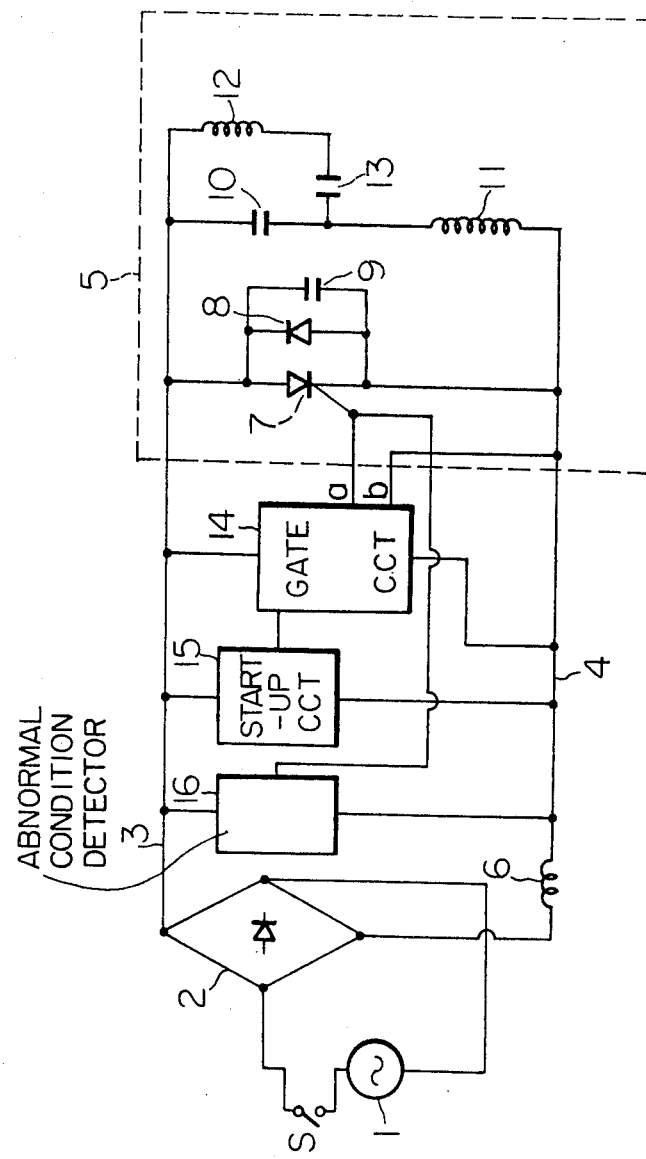
FIG. 1 is a general circuit block diagram of an induction heating apparatus in accordance with the present invention.

Referring now to the drawings, wherein like parts are indicated at like numerals throughout the several views, particularly in FIG. 1 there is shown a circuit block diagram of an induction heating apparatus in accordance with the present invention. Reference numeral 1 indicates a commercial power supply to which a full-wave rectifier 2 is connected for supplying an unfiltered, full-wave rectified unidirectional excitation potential to a pair of bus lines 3 and 4. An inverter circuit 5 as indicated in dashed line is connected to the bus lines to receive the excitation potential. The inverter circuit 5 comprises a filter inductor 6 interposed in the bus line 4, a silicon-controlled rectifier or a thyristor 7 connected across the bus lines, a diode 8 in reverse relationship with the SCR 7, a noise suppressing capacitor 9, and a capacitor 10 and an inductor 11 in series relationship to each other and in parallel relationship to the thyristor 7, and series connected induction heating coil 12 and a capacitor 13 in parallel relationship to the capacitor 10. Numeral 14 is a gate circuit for generating pulses for conducting the SCR 7, and 15 is an oscillation start-up circuit to assure stabilized oscillation of the invertor 5, and 16 is a circuit for detecting abnormal load condition by sensing the variation of oscillation frequency and of mode of oscillation due to abnormal load condition and for deenergizing the oscillation start-up circuit 15, thereby, protecting the invertor from the abnormal load condition.

Figure 2:
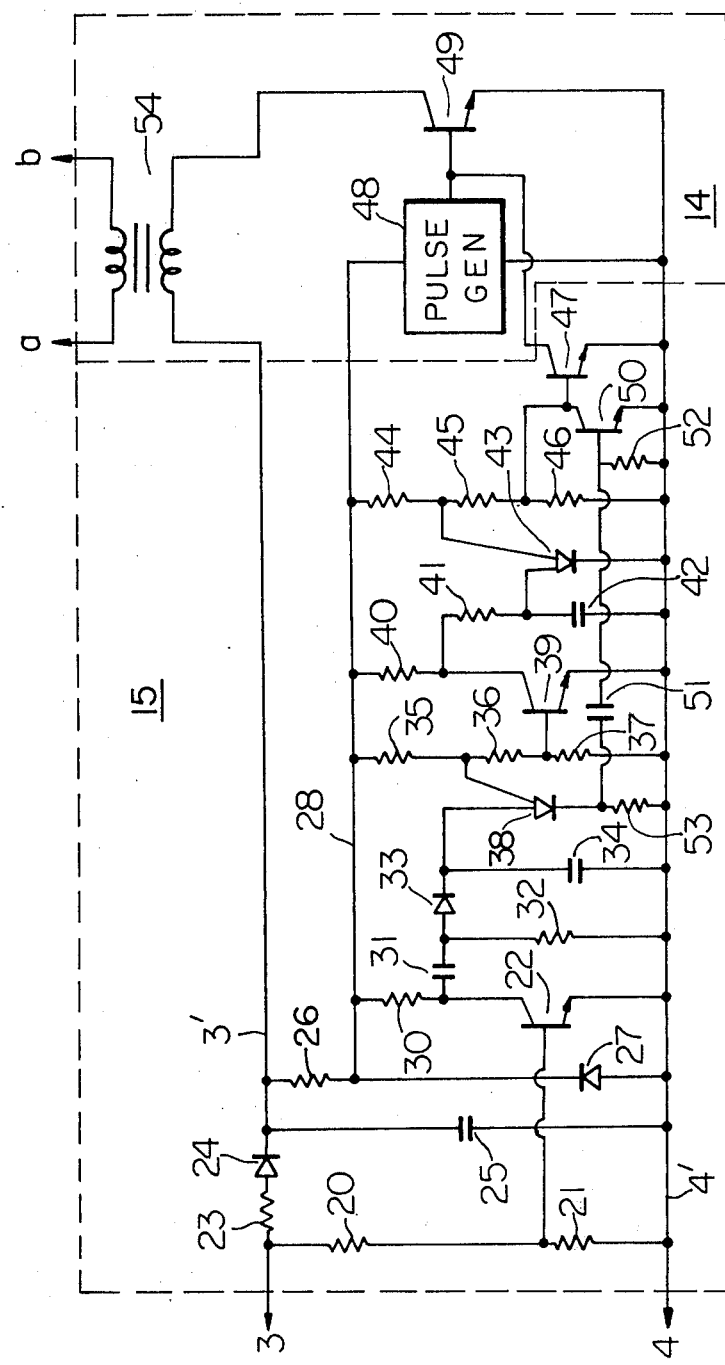
FIG. 2 is a circuit diagram of an energization start-up circuit usable with the induction heating apparatus of FIG. 1.
Figure 3:
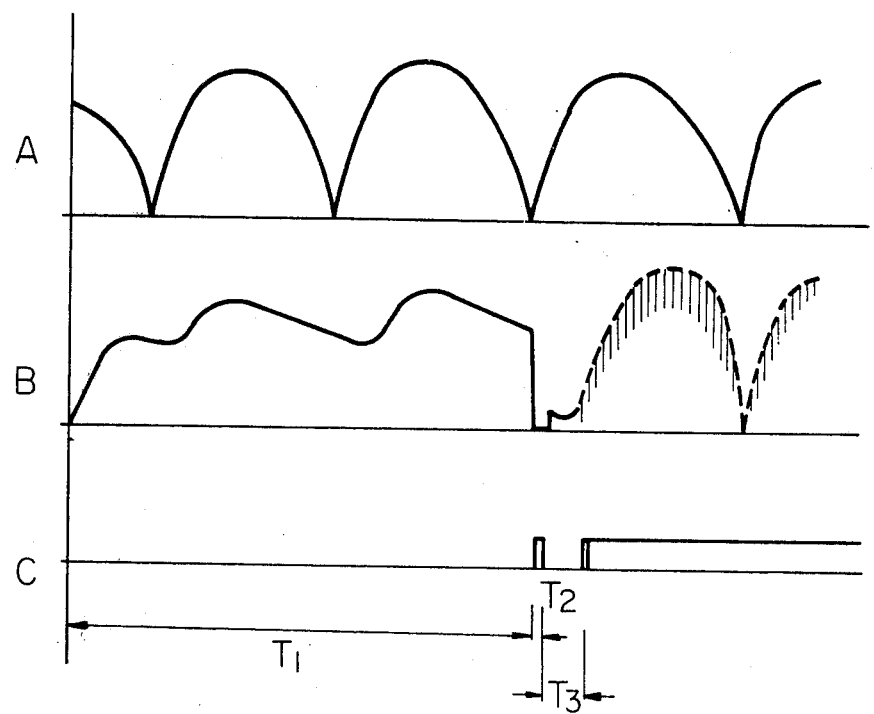
FIG. 3 is an explanatory diagram useful for describing the operation of the FIG. 2 circuit.

In FIG. 2 there is shown a first preferred embodiment of the present invention. The full-wave rectified voltage is applied to terminals 3 and 4 across which a set of resistors 20 and 21 is connected to supply the base of a transistor 22 with a reduced rectified voltage. The transistor 22 is a zero-point sensing element and adapted to be rendered nonconductive at the beginning of each half cycle of the full-wave rectified voltage. A series connected resistor 23 and diode 24 are interposed in the bus line 3' to provide a direct-current voltage which is further reduced in voltage by means of a resistor 26 and applied to breakdown diode 27. A smoothing capacitor 25 is connected across the bus lines 3' and 4'. The breakdown diode 27 supplies the bus line 4' and 28 with a constant d.c. voltage. The collector of transistor 22 is thus held at a constant d.c. voltage through the resistor 30. When the full-wave rectified potential is at or near zero point, the voltage across the resistor 21 is reduced to zero volt and the transistor 22 is turned off to charge a capacitor 31 through the resistor 30. The charge current flows through a resistor 32 and a peak voltage develops thereacross determined by the values of the resistor 32 and capacitor 31. A diode 33 allows the peak voltage to be applied to a capacitor 34. Whenever, the input full-wave rectified potential is at or near the zero point, a charge is accumulated in the capacitor 34. Thus, the energy stored in the capacitor 34 increases stepwise in synchronism with the beginning of each half cycle of the rectified voltage during time period $T_1$ (FIG. 3). A set of series connected resistors 35, 36, 37 is connected across the bus line 4' and 28 to supply a bias voltage to the gate of a PUT 38 to the anode of which is also applied the stepped-up energy accumulated in the capacitor 34 until sufficient gating energy is obtained. The instant the anode voltage reaches the gate bias voltage, the PUT starts conducting at time $T_1$ to pass a current through a resistor 53. A voltage developed across the resistor 53 is differentiated by a differentiator circuit including a capacitor 51 and a resistor 52. The differentiator has its midpoint connected to a transistor 50. A pulse developed at the differentiator drives the transistor 50 and turns off transistor 47 and turns on transistor 49 for the duration of the pulse width ($T_2$). Since the pulse generator 48 is energized upon actuation of the apparatus, a pulse is delivered from the pulse generator through the transistor 49 to a pulse transformer 54 and drives the SCR 7 (FIG. 1). Simultaneously, upon PUT 38 being turn on, transistor 39 is caused to turn off and a current will flow through resistor 40 and 41 and charge a capacitor 42. After the elapse of a predetermined time ($T_3$) preset by the capacitor 42, the voltage thereacross reaches a voltage level sufficient to cause the PUT 43 to be conductive. Upon PUT 43 being turned on, the transistor 47 is rendered non-conductive, and turns on the transistor 49 for allowing a train of gating pulses to appear across the primary winding of the transformer 54. Thereafter the SCR 7 is continuously gated on and off to generate oscillatory energization currents. If the duration $T_2$ is too long, there could arise a likelihood of a loss of sufficient energy for current inversion. The loss of energy could lead to a failure in starting up the inverter. Therefore, the time duration $T_2$ should be chosen in consideration of the inverter constant, particularly, the capacitance of the inverting capacitor.

It will be understood that the resistors 40, 41 and the capacitor 42 serve to function as a delay circuit for actuating the PUT 43 after time period $T_1$ has elapsed.

During the time period $T_3$, the rectified voltage rises to several ten volts which value is suitable for gating on the SCR. The reason for provision of such time duration is for preventing a failure in inverting currents, since the inverter, if started up at zero voltage level, would encounter the loss of energy required for inverting currents. On the other hand, if the oscillation is started up when the rectified voltage is high, the SCR 7 would generate an abnormally high voltage which would destroy the SCR 7 and the diode 8. Therefore, the time duration $T_3$ is a time during which the inverting voltage has reached a voltage level at which oscillation can be started up. It will be understood that the time duration $T_3$ can be set up by detecting the voltage level suitable for inverting energization currents.

Figure 4:
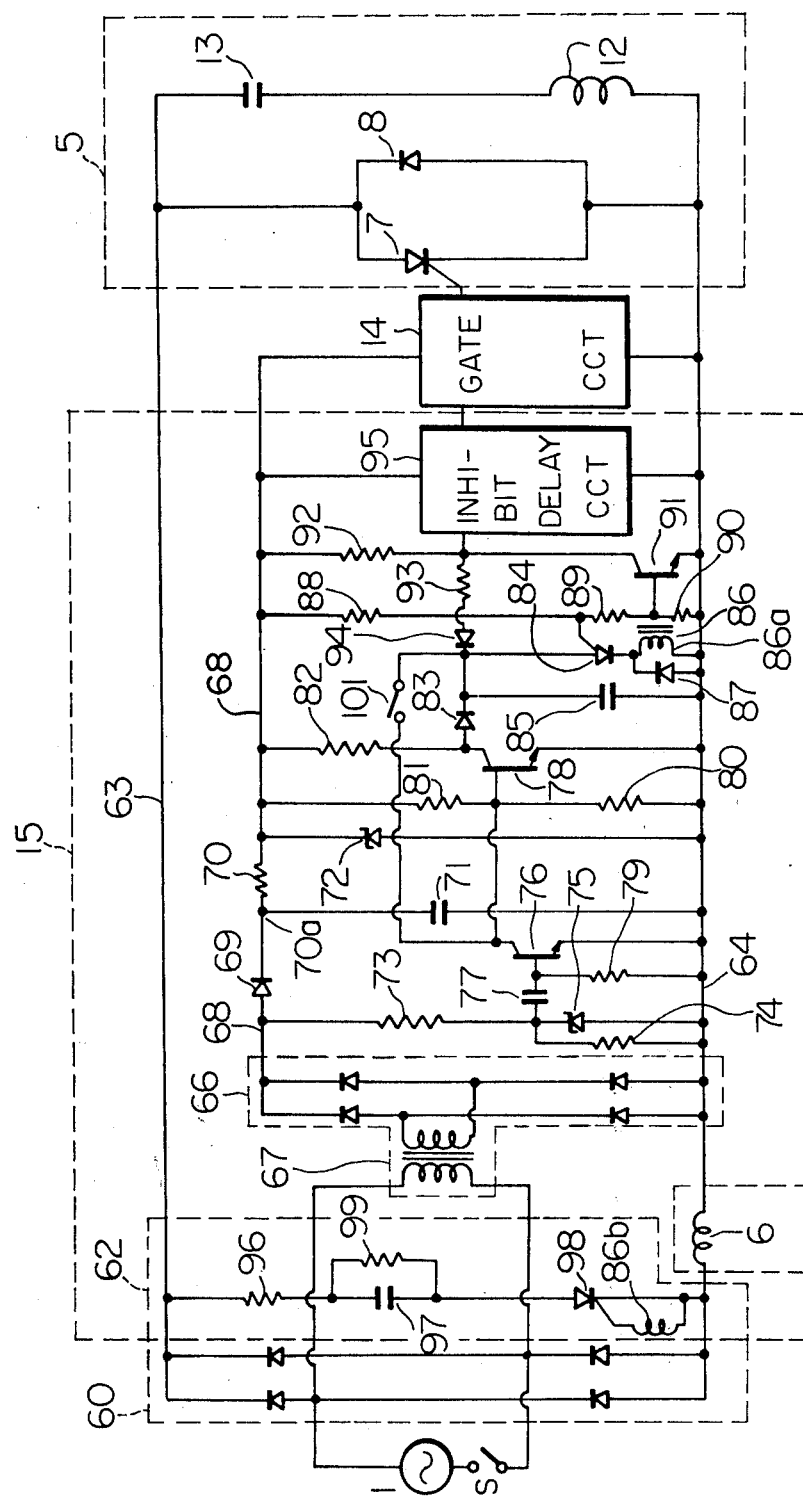
FIG. 4 is a circuit diagram of a modified form of the start-up circuit usable with the induction heating apparatus of FIG. 1.
Figure 5:
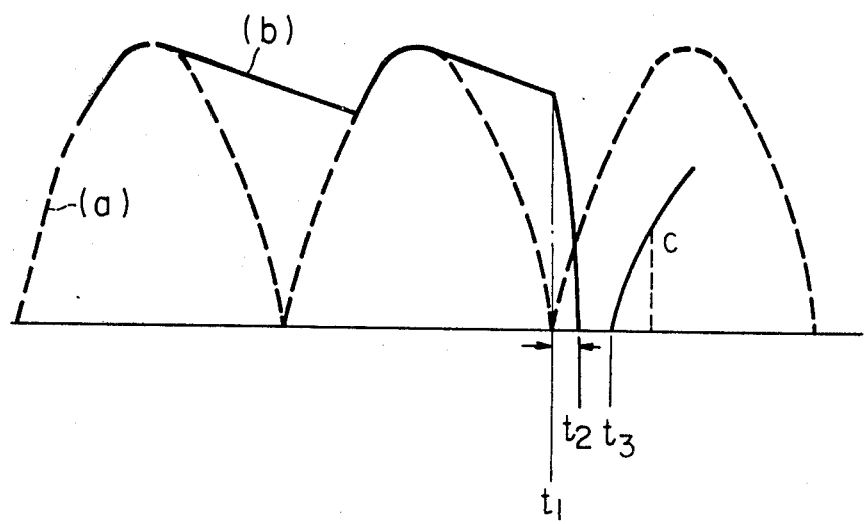
FIG. 5 is an explanatory diagram useful for describing the operation of the FIG. 4 circuit.

FIG. 4 illustrates details of the start-up circuit 15 used for initiating periodic energization currents in a stabilized manner. A first full-wave rectifier 60 to rectify alternating voltage supplied from a source 1 is connected across a pair of bus lines 63 and 64 for supplying excitation potential to the inverter circuit 5, with the inductor 6 being interposed in the bus line 64. A second full-wave rectifier 66 receives the alternating voltage supply from the source 1 through a transformer 67 to deliver a full-wave rectified voltage to a pair of bus lines 64 and 68. A diode 69 and a resistor 70 are interposed in the bus line 68. A smoothing capacitor 71 is connected across the junction 70a and the bus line 64, and a breakdown diode 72 is also connected across the bus lines 64 and 68. The breakdown diode serves to deliver constant amplitude direct-current voltage to the later stage of the gate control circuit. A set of parallel connected breakdown diode 75 and resistor 74 is connected to a resistor 73 across the bus line 64 and 68. The breakdown diode 75 serves to clip the wave-form into pulses of constant magnitude. A differentiating circuit including a capacitor 77 and a resistor 79 has its midpoint connected to the base of a transistor 76. The differentiating circuit differentiates the constant amplitude pulses and serves to drive the transistor 76 when the full-wave rectified voltage is at or near the zero voltage level. Upon transistor 76 being turned on a transistor 78 is rendered non-conductive, allows a current to pass through a resistor 82 and a diode 83 and charges a capacitor 85. The capacitor 85 thus stores energy stepwise as previously described. When the stored energy exceeds a given level determined by the resistor network comprising a resistors 88, 89 and 90 connected across the bus lines 64 and 68, a PUT 84 is rendered conductive and allows a current to pass through the primary winding 86a of a pulse transformer 86 which is shunted by a backward biased diode 87. At the left side of the inductor 6 is provided a charge absorbing circuit 62 connected across the bus lines 63 and 64, which comprises a resistor 96, a capacitor 97 and a resistor 99 connected in parallel relationship to each other, an SCR 98 having its cathode connected to the bus line 64, and the secondary winding 86b of the pulse transformer 86. When the PUT 84 is made conductive, a current will be induced in the secondary winding 86b to cause the SCR 98 to initiate conduction. This provides a circuit for discharging the energy stored in the capacitor 13 of the inverter 5 into the capacitor 97 of the charge absobing circuit 62. On the other hand, the conduction of the PUT 84 makes a transistor 91 connected across the bus lines 64 and 68 through a resistor 92 nonconductive to enable a pulse delaying circuit 95 to deliver a delayed pulse to the gate circuit 14. In FIG. 5 curve $a$ represents a full-wave rectified voltage, and curve $b$ represents a voltage developed across the bus lines 63 and 64 when the capacitor 13 discharges its stored energy through the charge absorbing circuit 62, as referred to above, by the conduction of the SCR 98. Assuming that the SCR 98 starts conducting at time $t_1$, the energy stored in the capacitor 13 is rapidly discharged and the curve $b$ falls to the zero voltage level at time $t_2$. During the time between $t_2$ and $t_3$, the diode 8 prevents current from flowing in the inverter circuit 5. The delay circuit 95 is for enabling the gate circuit 14 to deliver its output to the SCR 7 during the time period between $t_2$ and $t_3$.

It is to be understood that the energy stored in the capacitor 13 is completely discharged at a zero voltage point after delay of the initial few cycles of energization voltage so that the inverter circuit 5 is started up in a stabilized manner. Therefore, the SCR used in the inverter circuit is not required of a high current capacity, and a failure in inverting oscillatory current is not likely to occur.

Figure 6:
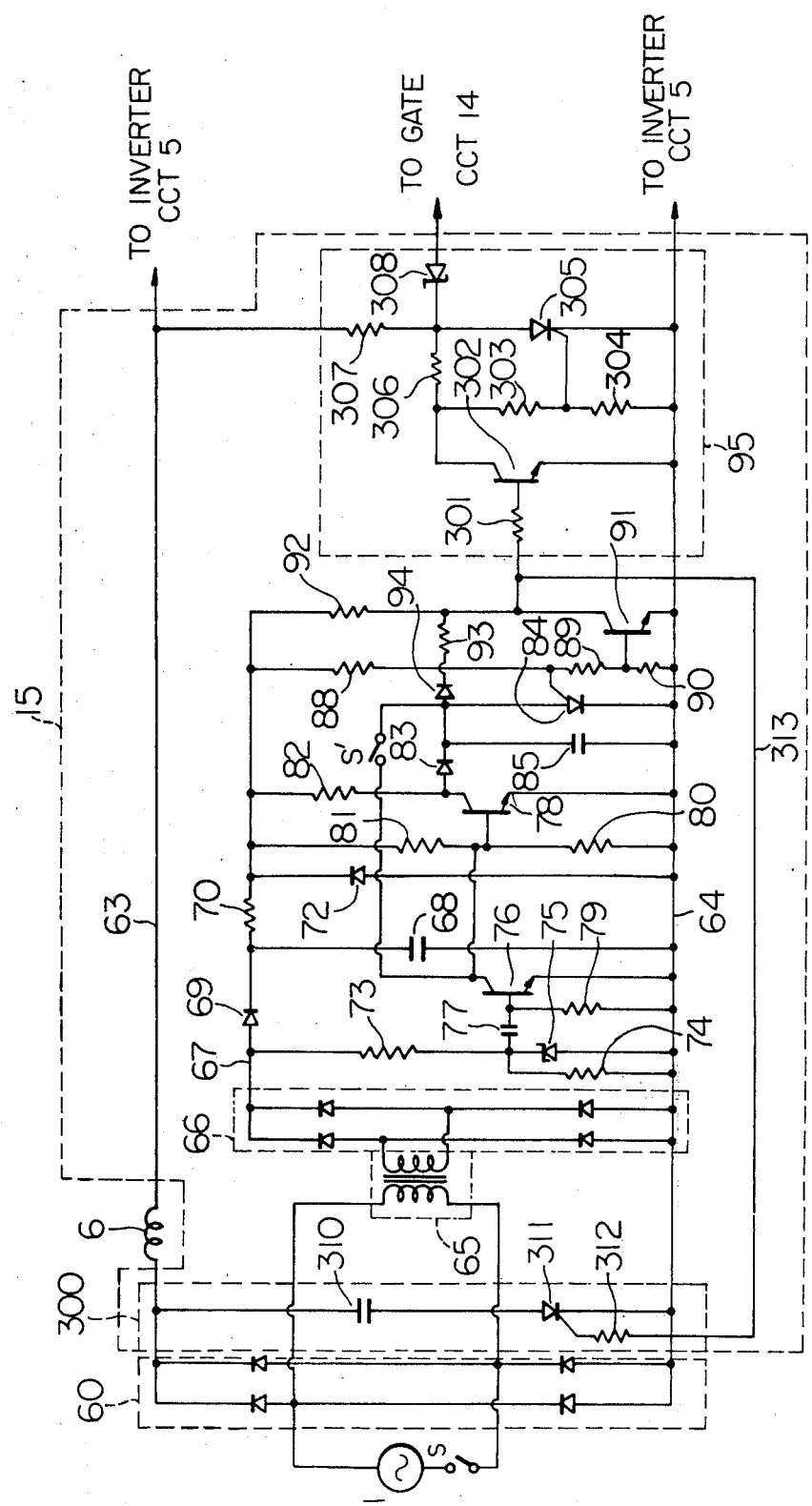
FIG. 6 is a circuit diagram of another modified form of the start-up circuit usable with the induction heating apparatus of FIG. 1.

FIG. 6 illustrates a modified form of the FIG. 4 arrangement wherein similar parts are numbered with like numerals. The charge absorbing circuit 300 is connected across the bus lines 63 and 64 and comprises a capacitor 310 and a SCR 311 connected in series relationship to each other. The gate of the SCR 311 is coupled to the collector of transistor 91 by way of a resistor 312. As previously described in connection with FIG. 4, the transistor 76 starts conducting when the full-wave rectified voltage is at or near the beginning of each half cycle. The conduction of the transistor 76 in turn renders the transistor 78 non-conductive and thus allows a current to pass through the resistor 82 and a diode 83 charging the capacitor 85. The voltage across the capacitor rises stepwisely and when it exceeds the potential applied to the gate of the PUT 84, the PUT 84 starts conducting and turns off the transistor 91. The SCR 311 is thus given a voltage to its gate through conductor 313 and rendered conductive. The charge absorbing circuit 300 completes its circuit and the capacitor 310 absorbs the charge accumulated in the inverter 5. The turning-off of the transistor 91 also causes a transistor 302 of the inhibit-delay circuit 95 to turn on. An SCR 305 connected across the bus lines 63 and 64 through a resistor 307 has its gate and anode electrodes shunted by a set of resistors 303 and 306 and its gate and cathode electrodes shunted by a resistor 304. This arrangement provides a self-triggering circuit for the SCR 305, which maintains its conduction state upon actuation of the switch S. When the voltage across the bus lines 63 and 64 drops to the zero voltage level, the SCR 305 is turned off and remains non-conductive by a short circuit due to the conduction of the transistor 302. When the voltage reapplied across the bus lines 63 and 64 rises again to a predetermined level $c$ (FIG. 5), a constant voltage detector such as a zener diode 308 starts conducting to deliver a signal to the gate circuit 14. It will be understood from the foregoing that the inhibit-delay circuit 95 achieves a timing action to delay the operation of the gate circuit 14 until the reapplied voltage rises to a voltage level suitable for oscillation as determined by the breakdown voltage of zener diode 308 suitable for oscillation.

Figure 7:
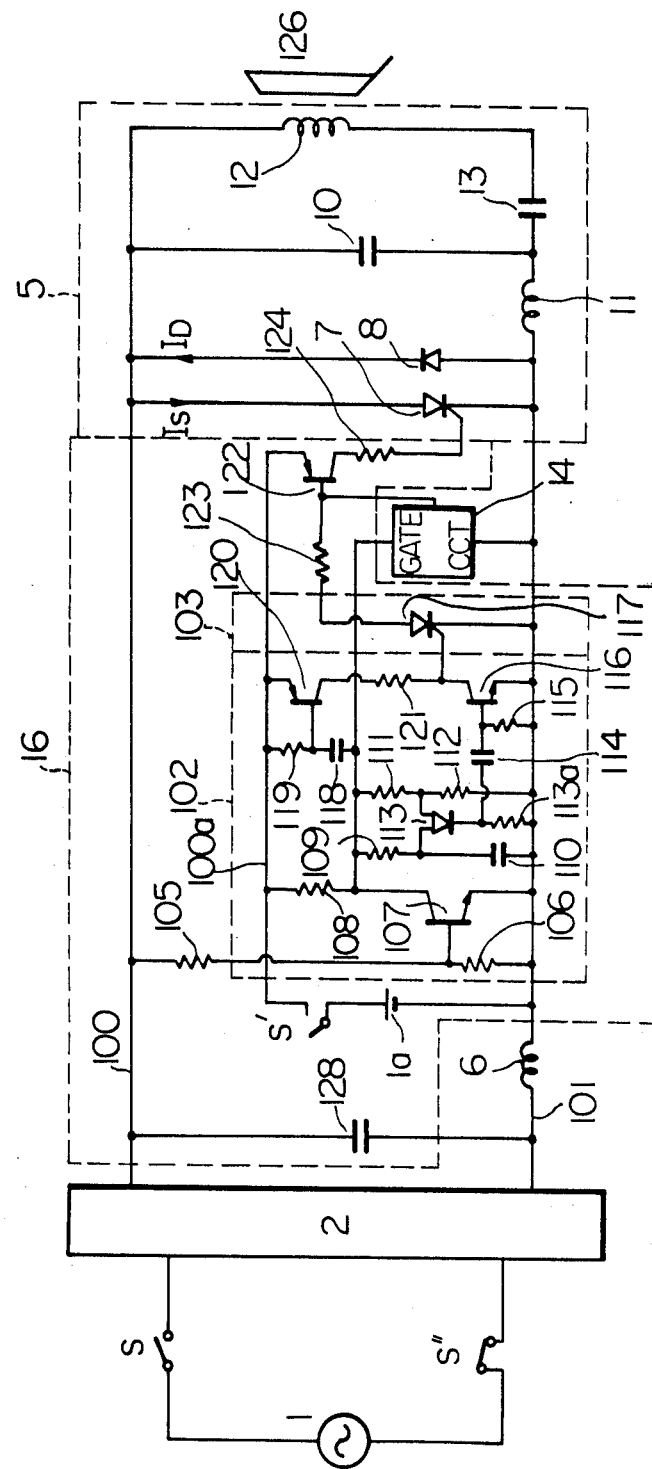
FIG. 7 is a circuit diagram of an abnormal load condition detector usable with the induction heating apparatus of FIG. 1.

FIG. 7 illustrates a still another preferred embodiment of the present invention for detecting the variation of oscillation frequency of energization currents due to abnormal load condition. In FIG. 7, the power source 1 is connected to the full-wave rectifier 2 as usual which delivers a full-wave rectified excitation potential to a pair of bus lines 100 and 101. A smoothing capacitor 128 is connected across the bus lines and the inductor 6 is interposed in the bus line 101. A direct-current power source 1a provides through a ganged switch S' a constant d.c. voltage to a bus line 100a. The inverter circuit 5 in dashed line is connected across the bus lines 100 and 101 in a manner similar to that described previously to receive power from the full-wave rectifier 2. An abnormal condition detector 102 and a memory circuit 103 for deenergizing the inverter when the abnormal condition is detected are provided as shown in dashed lines. Resistors 105 and 106 are connected across the bus lines 100 and 101 to supply a control voltage to a transistor 107.

Upon actuation of the switches S and S', a transient current flows from a d.c. power source 1a through resistors 108, 109 and a capacitor 110 in which electrical energy accumulates in an interval $T_1 - T_R/2$ determined thereby. Simultaneously, resistors 111 and 112 provides a predetermined potential to the gate of a PUT 113. When the voltage across the capacitor 110 rises to the same potential as applied to the gate of the PUT 113. The PUT 113, is turned on to allow current to flow through a resistor 113a connected in series thereto which is in turn shunted by an RC circuit comprised by a capacitor 114 and a resistor 115. A voltage will be developed across the resistor 113a and a pulse having a duration $T_r$ is produced by the RC circuit 114, 115. During period $T_r$, a transistor 116 is rendered conductive. On the other hand, after the first cycle of energization currents in the inverter circuit, the excitation potential (V) develops across the bus lines 100 and 101 and the transistor 107 is rendered conductive. Turn-on of transistor 107 permits a current to flow through a resistor 119 and a capacitor 118 to develop thereacross a voltage to be supplied to a transistor 120. The transistor 120 is thus rendered conductive forming a short circuit to the gate of a SCR 117. It will therefore be understood that under normal load condition simultaneous conduction of the transistors 116 and 120 occurs and disables the SCR 117; that is, if the commutation interval of the energization current terminates within the predetermined time period $T_r$, (FIG. 82) the SCR 117 which serves as a memory unit remains nonconductive. On the other hand, turn-on of transistor 107 energizes the gate circuit 14 to deliver a train of gating pulses which is amplified by a transistor 122 to trigger the SCR 7 at a high repetition rate.

Figure 8:
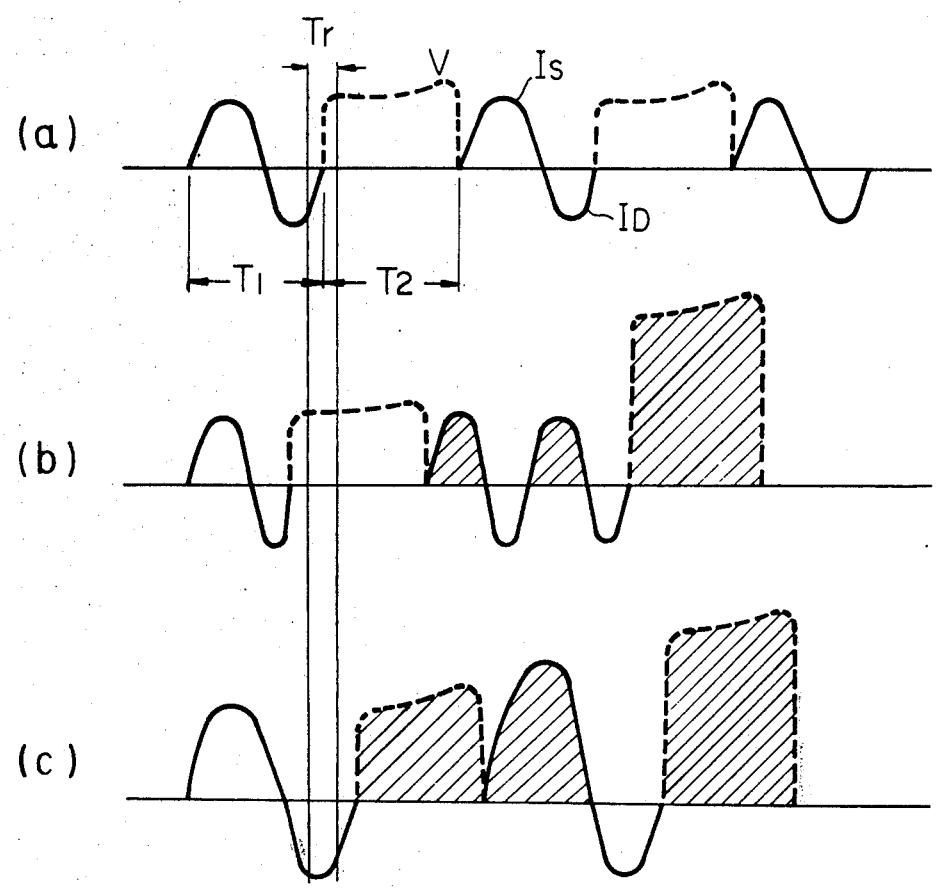
FIG. 8 is an explanatory diagram useful for describing the operation of the FIG. 7 circuit.

If an abnormal condition occurs, for example, non-magnetic material is used as a load 126 to be heated, one cycle of oscillation will have a shorter duration tha that of the normal condition as depicted in FIG. 8(b); that is the oscillation cycle terminates within the predetermined time $T_1$. This would cause a premature conduction of the transistor 107 due to the subsequent rise of excitation potential across the bus lines 100 and 101 and thus renders the transistor 120 conductive. At this instant, the transistor 116 is not yet rendered conductive, and therefore the gate potential of the SCR 117 rises to an energization point, thereby making it conductive. Since the SCR 117 is a self-holding element, the abnormal condition is thus memorized, and the SCR 7 is in turn forcibly rendered conductive to inhibit the inverter circuit 5 to generate oscillation until deenergization of the induction heating apparatus.

Since SCR 7 is maintained continuously conductive, an overcurrent would flow in the secondary winding coil of the full-wave rectifier 2. This causes a circuit breaker S' of the conventional type inserted in the power supply circuit to be actuated to disconnect the power source 1 from the rectifier 2.

Where a ferromagnetic material is used as a load 126, the effective inductance of the load will become larger than that of the normal condition. The result is a longer periodic cycle time as depicted in FIG. 8(c). Since the first periodic cycle terminates after the transistor 116 has returned to normal non-conductive state, the conduction of the transistor 107 upon subsequent energization of the bus lines 100 and 101 due to the voltage V renders the transistor 120 conductive, resulting in the energization of the SCR 117 which again acts as a memory unit for delivering a continuous output for the SCR 7. As previously described, the SCR 7 is thus forcibly rendered conductive to inhibit the oscillation. It will be understood from the foregoing that the transistors 116 and 120 may constitute a coincidence or NAND circuit for starting up energization currents when the period of one cycle of the energization currents lies within the predetermined period and for inhibiting energization currents when that one cycle lies outside of the predetermined period. Furthermore, the protection circuit for preventing the overcurrent from flowing through the inverter circuit may include an element such as Triac, Trademark of General Electric Co., or any other circuit element which is actuated in response to the energization of the SCR 117 in such a way as to remove the input power from the induction heating equipment.

Figure 9:
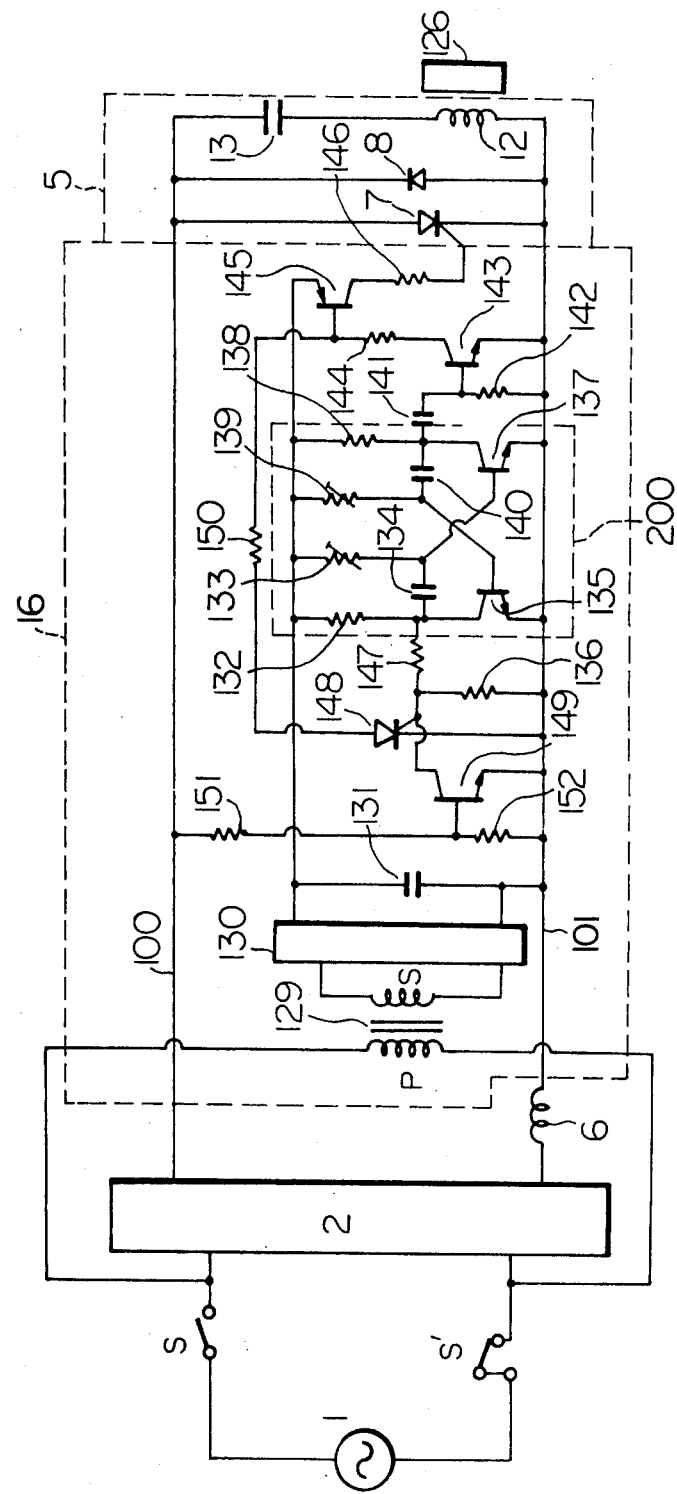
FIG. 9 is a circuit diagram of another abnormal load condition detector usable with the induction heating apparatus of FIG. 1.
Figure 10:
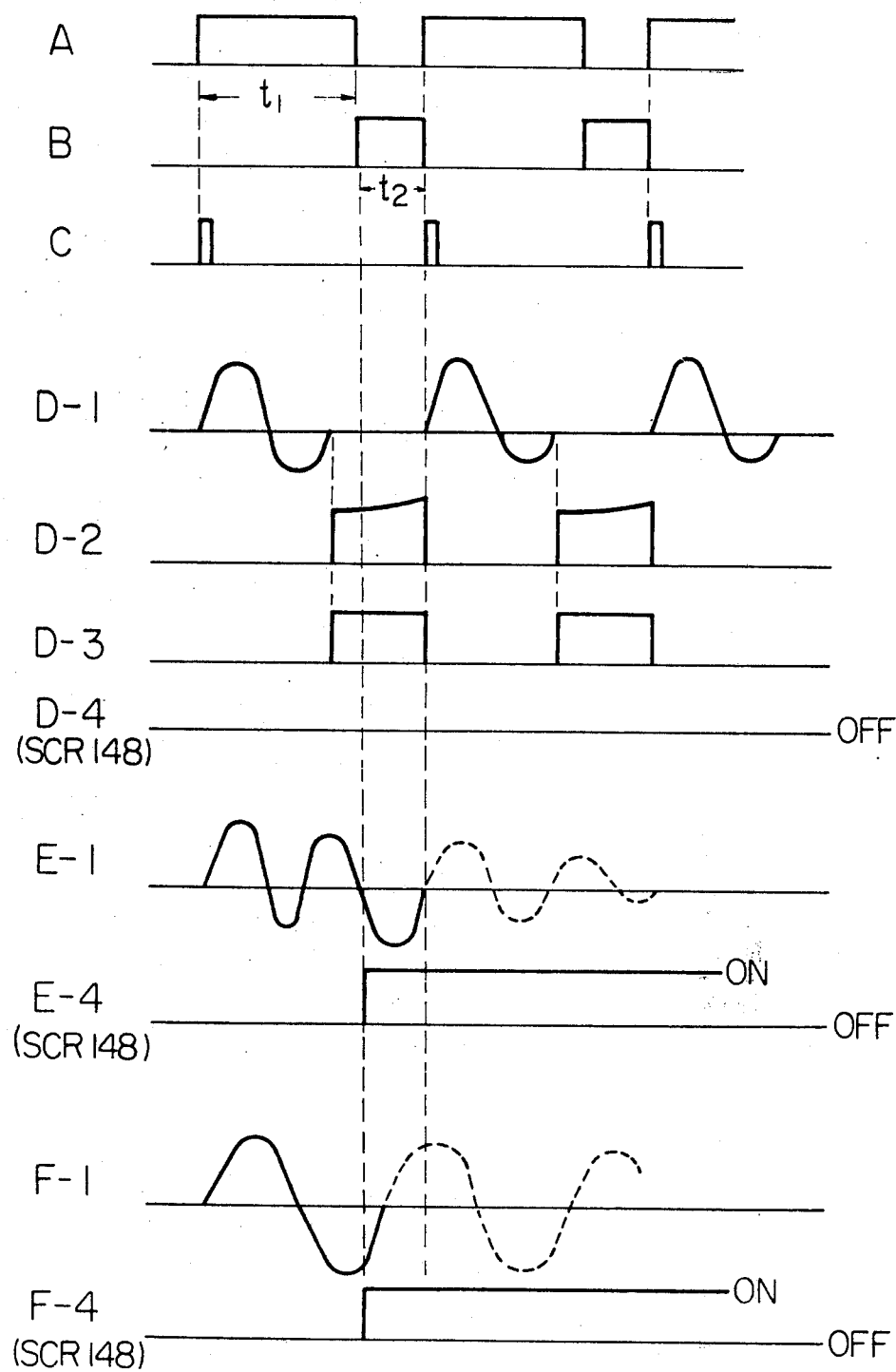
FIG. 10 is an explanatory diagram useful for describing the operation of the FIG. 9 circuit.

FIGS. 9 and 10 illustrate still another preferred embodiment of the invention for detecting the variation of oscillation frequency of energization currents due to abnormal load conditions. In this exemplary embodiment, a conventional astable multivibrator is employed for generating square pulses of different durations. The astable multivibrator 200 comprises a transistor 137 which delivers a first output pulse having a pulse width $t_1$ determined by the resistor 133 and the capacitor 134 and a transistor 135 which delivers a second output pulse having pulse width $t_2$ narrower than $t_1$ determined by the resistor 139 and the capacitor 140. The multivibrator 200 receives its d.c. power from a full-wave rectifier 130 connected across the secondary winding of a transformer 129 which in turn is connected to the input power circuit including the power source 1, a switch S and a circuit breaker S'. A smoothing capacitor 131 is provided for delivering a substantially constant voltage. The full-wave rectifier 2 also connected in the same manner as previously described across the power input circuit to deliver a full-wave rectified voltage to a pair of bus lines 100 and 101. The inverter circuit 5 of the same circuit configuration as previously described is connected across the bus lines to receive its power from the full-wave rectifier 2.

Upon actuation of the switch S, the multivibrator 200 is energized to deliver pulses as shown in FIGS. 10a and 10b. The first output pulse $t_1$ delivered at the collector of the transistor 137 is differentiated by a differentiating circuit including a capacitor 141 and a resistor 142 having their midpoint connected to the base of a transistor 143. The differentiated pulse (FIG. 10c) is amplified by a transistor 145 and supplied to the SCR 7 by way of a resistor 146 and thus the SCR 7 is triggered. Under normal load condition, oscillatory energization currents would flow in its upper half cycle through the SCR 7 and in its lower half cycle through the diode 8 (FIG. 10, D-1). Immediately after each periodic cycle, the SCR 7 is turned off and excitation potential as shown in D-2 of FIG. 10 develops thereacross. While the potential develops across the SCR 7, the transistor 149 is made conductive as shown in D-3 of FIG. 10. Turn-on of the transistor 149 provides a short circuit to the gate electrode of an SCR 148. During the conduction period of the transistor 149, a second outut $t_2$ is delivered from the transistor 135 of the multivibrator 200 to the gate of the SCR 148. Since the SCR 148 has its gate short-circuited by the transistor 149, the application of the second output pulse has no effect on the 148 and thus it remains non-conductive. Thus no input pulse appears at the input to the transistor 145.

On the other hand, if a non-magnetic material is used as a load 126, the periodic cycle of the oscillatory current will become shorter than that of the normal load condition and an oscillatory current as shown in FIG. 10, E-1 will flow through the inverter circuit 5. The commutation interval of energization current would and terminate within the time period $t_2$ wherein a second output pulse $t_2$ appears at the gate of the transistor 149. However, at the instant the second pulse appears, the transistor 149 is non-conductive because no voltage appears across the SCR 7. The SCR 148 is thus energized by the application of the second pulse T2 which, once energized, remains conducting and provides a short circuit to the base of the transistor 145 by way of a resistor 150. The SCR 7 is thus kept conductive and the oscillatory energization current at frequencies in the range of 20 kHz would decay as shown in dashed curve in FIG. 10, E-1. On the other hand, with the SCR 7 being made continuously conductive, a full-wave rectified overcurrent would flow in the secondary winding coil of the rectifier. This causes a circuit breaker S' inserted in the power circuit to be actuated to disconnect the power source from the rectifier 2. If the SCR 7 is not rendered continuously conductive, a high voltage potential would develop across the SCR 7 and the diode 8 superimposing the damped oscillation and there is a danger of serisouly destroying these elements.

In like manner, if a ferromagnetic material is used as a load, an oscillation would occur at a lower repetition rate than that of the normal load condition as depicted in FIG. 10, F-1. The first cycle of the oscillation terminates within the time period $t_2$, and a second pulse $t_2$ appears at the gate of the SCR 148 which produces an input as shown in FIG. 10, F-4 to transistor 145. The SCR 7 is thus continuously rendered conductive to allow a damped oscillation to occur in the inverter circuit.

It will be understood that the transistor 149 serves the function of inhibiting the conduction of the SCR 148 by shorting its gate circuit, and the SCR 148 serves the function of a memory circuit for maintaining that an abnormal condition has been detected.

What is claimed is:
1. An induction heating apparatus comprising:
   a power supply circuit including a rectifier coupled to an alternating current power source for generating a full-wave rectified unfiltered unidirectional excitation potential;
   a switching circuit including a gate-controlled switching device and a unidirectional conducting device connected in inverse parallel relation to said gate-controlled switching device;
   a commutating circuit connected to said switching circuit and including an induction heating coil and a commutating capacitor connected to the excita- tion potential to charge and discharge electrical energy through said induction heating coil and said switching circuit, said commutating circuit having a resonant frequency;

a gating circuit for gating on said gate-controlled switching device at a frequency substantially equal to the resonant frequency of said commutating circuit to allow said commutating capacitor to charge and discharge at this frequency to generate oscillation current which drives said induction heating coil;

means for detecting the zero voltage points of the full-wave rectified unfiltered unidirectional excitation potential;

inhibit means for inhibiting operation of said gating circuit;

a discharge circuit responsive to said detecting means for discharging said commutating capacitor when a predetermined number of detected zero voltage points is reached; and means operable upon the predetermined number of the detected zero voltage points being reached to allow a predetermined interval for causing said inhibit means to be disabled so that said gating circuit is operated to charge said commutating capacitor to a level sufficient to generate said oscillation current.

2. An induction heating apparatus comprising:

a power supply circuit including a rectifier coupled to an alternating current power source for generating a full-wave rectified unfiltered unidirectional excitation potential;

a switching circuit including a gate-controlled switching device with a control gate, and a unidirectional conducting device connected in inverse parallel relation to said gate-controlled switching device;

a commutating circuit connected to said switching circuit and including an induction heating coil and a commutating capacitor connected to the excitation potential to charge and discharge electrical energy through said induction heating coil and said switching circuit, said commutating circuit having a resonant frequency;

a first transistor having its base connected to said rectifier and its emitter-collector path connected to a source of DC voltage;

a first RC delay circuit connected in parallel to said emitter-collector path of said first transistor for developing a first rising voltage whenever said first transistor is nonconductive at each zero voltage point of the excitation potential;

a first detector for detecting when the first rising voltage reaches a first predetermined voltage;

means for generating a discharge command pulse whenever the first rising voltage reaches the first predetermined voltage;

a pulse generator for generating a series of gating-on pulses at a frequency substantially equal to the resonant frequency of said commutating circuit;

a second transistor having its base connected to output of said pulse generator and its emitter-collector path connected to said control gate of said gate-controlled switching device and further responsive to the discharge command pulse for gating on said gate-controlled switching device to cause said commutating capacitor to discharge its stored energy;

a second RC delay circuit connected to said DC voltage source to develop a second rising voltage whenever the first rising voltage reaches the first predetermined voltage;

a second detector for detecting when the second rising voltage reaches a second predetermined voltage to allow said commutating capacitor to be charged by the excitation potential; and a third transistor having its emitter-collector path connected to output means of said pulse generator and its base connected to said second detector for providing a short circuit path to said output means until the second rising voltage reaches the second predetermined voltage.

* * * * *